Feb. 18, 1941.   J. H. ROONEY ET AL   2,232,012
MANUFACTURE OF SHEET MATERIALS
Filed Oct. 2, 1937
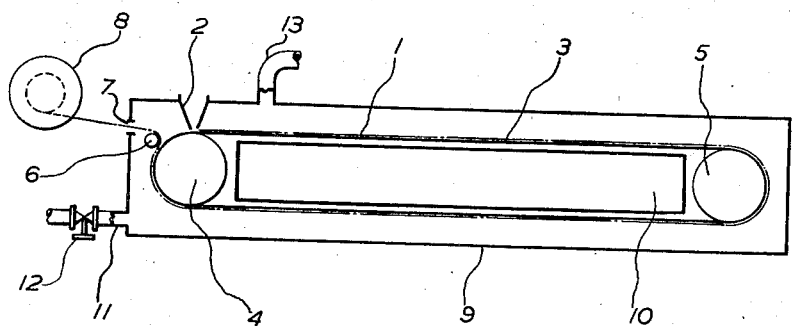
Inventors:
James H. Rooney
Philip R. Hawtin
by J Seltzer and [signature]
Attorneys Patented Feb. 18, 1941

2,232,012

UNITED STATES PATENT OFFICE 2,232,012

MANUFACTURE OF SHEET MATERIALS

James Henry Rooney and Philip Richard Hawtin, Spondon, near Derby, England, assignors to Celanese Corporation of America, a corporation of Delaware Application October 2, 1937, Serial No. 167,039
In Great Britain October 9, 1936

1 Claim. (Cl. 18—57)

This invention relates to improvements in the manufacture of sheet materials and has more particular reference to the manufacture of comparatively thick films having a basis of cellulose derivatives.

In the manufacture of comparatively thin films, for example films of a thickness of .001 inch or .003 inch, by casting a solution of cellulose acetate in acetone and evaporating the acetone, considerable speeds can be obtained at comparatively low temperatures, for example 30° C. When, however, films of a greater thickness are required, and particularly .005 inch and over, for example, up to .020 inch, the speed at such temperatures necessarily becomes very slow. If it is attempted to increase the speed by increasing the temperature of the air used for evaporation of the volatile solvent, difficulties are at once met with owing to bubble formation. Thus in the case of evaporating acetone from a film of cellulose acetate solution, bubble formation is too severe for commercial practice at 35° C. Similar considerations, of course, apply to the manufacture of films from other solutions containing a film-forming substance dissolved in a volatile solvent. There is always an upper limit for each solvent, beyond which it is commercially impracticable to carry out evaporation.

We have now found that higher temperatures may be employed for the whole evaporation and hence higher speeds may be used by carrying out the evaporation in at least the initial stages in an atmosphere containing a substantial proportion of the volatile solvent which it is desired to evaporate, and according to the present invention, therefore, in the manufacture of films, sheets and the like, a solution of the cellulose derivative in a volatile solvent medium is passed through a suitable shaping device into an evaporative atmosphere which contains, in the neighbourhood of the shaping device, a substantial proportion of the vapours of a solvent for the cellulose derivative.

Advantageously the concentration of the solvent vapour in the evaporative atmosphere is highest in the neighbourhood of the shaping device, the proportion of solvent vapour in the evaporative atmosphere contacting with the shaped product being less and less as the distance from the shaping device is greater. Preferably the solvent vapour in the evaporative atmosphere is the vapour of the solvent medium which it is desired to evaporate from the cellulose derivative solution. The process of this invention can, therefore, be very satisfactorily effected by employing a current of evaporative atmosphere which flows in a direction opposite to the direction of travel of the shaped film or sheet, the relative rates of flow of the film or sheet and of the evaporative atmosphere being adjusted in relation to the volatility of the solvent medium so that the evaporative atmosphere reaching the shaping device contains a substantial proportion of volatile solvent picked up from the film or sheet during the travel of such evaporative atmosphere towards the shaping device. By this means the film or sheet may be subjected during its setting to an evaporative atmosphere of progressively decreasing solvent content.

The optimum concentration of solvent vapour in the evaporative atmosphere surrounding the shaping device will depend on the nature of the solvent in question. Thus, where a solution of cellulose acetate in acetone is employed for forming the film or sheet, the concentration of acetone vapour in the evaporative atmosphere near the shaping device should be at least 1.5% by volume. By employing near the shaping device an evaporative atmosphere which contains 1.5 to 2% by volume of acetone, films and sheets of high gloss and free from bubbles may be obtained by effecting the film formation at a temperature of 40° C. As indicated above, by the use of such a temperature the overall speed of film formation is considerably increased. By using an evaporative atmosphere which contains in the neighbourhood of the shaping device relatively high proportions of acetone, e. g., 1.5 to 2% or more by volume, products of a very high gloss may be obtained. However, acetone and air form an explosive mixture and care must be taken to avoid the possibility of explosion taking place. The risk of explosion when using high concentrations of acetone vapour, e. g. concentrations of 3 to 5% or more by volume, may be minimized by employing, instead of air as the evaporative medium, an inert gas such as nitrogen or carbon dioxide.

While, as already indicated, the invention is of greatest importance in the manufacture of comparatively thick films, for example 0.005 inch to 0.020 inch, nevertheless it may also be used in the manufacture of thin films of under 0.005 inch, again with resultant increase in the speed of production obtainable. Thick films may be cast in a single casting operation or may be cast as two or more superimposed films. Thus the band of a band machine may be progressively coated with cellulose derivative solution from a casting box, and as the now dried film once more comes under the casting box a second layer may be cast on to the first layer, and so on until the desired thickness of film is built up.

In order to prevent bubbles being drawn in between the cellulose derivative solution and the casting band or other support or between the cellulose derivative solution and an already cast layer of film, the angle formed between the solution and the casting band or already cast film is preferably supplied with a pocket of liquid which may, for example, be a solution of a plasticiser in a volatile solvent, as described in U. S. Application S. No. 102,490 filed 25th September 1936. The plasticiser may be the same plasticiser as that used in the dope to plasticise the film in the ordinary way.

Apparatus suitable for carrying out the invention is illustrated in diagrammatic cross-section in the accompanying drawing.

Referring to the drawing, a film 1 is formed by extrusion of a cellulose derivative in a volatile solvent medium through a shaping device 2. The film is formed on a continuous nickel casting band 3 supported on two rollers 4 and 5. The film 1 travels with the casting band 3 (in a clockwise direction as illustrated) until it reaches the take-off roller 6, after which it is led to a winding roller 8. The whole apparatus, with the exception of the winding roller 8, is enclosed in a casing 9 provided with a partition 10 extending across its width. The film 1 issues from the casing 9 through the openings 7. Evaporative atmosphere enters the casing by means of an inlet pipe 11, and a valve 12 is provided to permit control of the rate of flow of the evaporative atmosphere. The evaporative atmosphere flows counter-current to the direction of travel of the casting band and issues from the casing at the exit pipe 13, whence it may be led to a solvent recovery plant.

While the invention has been described above more particularly in the manufacture of films from solutions of cellulose acetate in acetone, it may also be used for the manufacture from solutions of cellulose acetate in other volatile solvents or from solutions of other cellulose derivatives in volatile solvents, e. g. cellulose propionate, cellulose butyrate or cellulose nitrate, mixed esters or cellulose ethers, for example methyl, ethyl or benzyl cellulose, or mixed ethers or mixed ether-esters. The plasticizers included in the cellulose derivative solution may be, for example, the phthalates, e. g. dimethyl or diethyl phthalate, the triaryl phosphates, e. g. tricresyl phosphate, sulphonamides, e. g. the monomethylated isomeric xylene sulphonamides, and the tartrates, e. g. dibutyl tartrate.

Having described our invention, what we desire to secure by Letters Patent is:—

Process for the manufacture of artificial films, sheets and the like, which comprises passing an acetone solution of cellulose acetate through a shaping device into an air-stream which is maintained at a temperature of the order of 40° C. and which travels countercurrent to the travel of the shaped solution, the rates of flow of the shaped solution and of the air-stream being so adjusted that the air-stream reaching the shaping device contains from 1.5 to 2% by volume of acetone vapor and the film leaving the air-stream is sufficiently dry to be wound, the substantially finished film of cellulose acetate produced having a thickness of at least .005".

JAMES HENRY ROONEY.
PHILIP RICHARD HAWTIN.